United States Patent [19]
Vandervaart

[11] Patent Number: 5,189,887
[45] Date of Patent: Mar. 2, 1993

[54] HEAT CONDENSING FURNACE WITH DE-INTENSIFIER TUBES

[75] Inventor: Gerry Vandervaart, Niagara Falls, Ontario, Canada

[73] Assignee: Kool-Fire Research & Development, Canada

[21] Appl. No.: 825,760

[22] Filed: Jan. 21, 1992

Related U.S. Application Data
[63] Continuation of Ser. No. 459,227, Dec. 29, 1989, abandoned.

[51] Int. Cl.$^5$ ............................................. F25B 29/00
[52] U.S. Cl. ................................. 62/238.7; 62/238.6; 62/324.5; 237/2 B; 165/29; 165/64; 165/913; 165/921
[58] Field of Search ............ 237/2 B; 62/238.6, 238.7, 62/324.5; 165/913, 921, 110, 117, 29, 64; 122/356

[56] References Cited
U.S. PATENT DOCUMENTS

| | | | |
|---|---|---|---|
| 2,182,586 | 12/1939 | Heid | 122/356 |
| 2,212,526 | 8/1940 | Mekler | 122/356 |
| 2,342,011 | 2/1944 | Ridenman | 122/356 |
| 3,692,103 | 9/1972 | Andoniev et al. | 165/147 |
| 4,311,191 | 1/1982 | Vandervaart | 62/238.6 |
| 4,311,192 | 1/1982 | Vandervaart | 62/238.6 |
| 4,502,626 | 3/1985 | Gerstmann et al. | 165/913 |
| 4,660,761 | 4/1987 | Bussjager | 237/2 B |
| 4,776,391 | 10/1988 | Warner | 165/913 |
| 4,798,240 | 1/1989 | Gerstmann et al. | 62/238.6 |
| 4,802,529 | 2/1989 | Sumitani et al. | 62/238.7 |

FOREIGN PATENT DOCUMENTS

| | | | |
|---|---|---|---|
| 0127939 | 12/1984 | European Pat. Off. | 237/2 B |
| 2547027 | 12/1984 | France | 62/238.6 |
| 0034155 | 3/1978 | Japan | 237/2 B |
| 0124138 | 7/1983 | Japan | 62/238.7 |
| 0105395 | 5/1988 | Japan | 62/238.6 |

*Primary Examiner*—John K. Ford
*Attorney, Agent, or Firm*—Diller, Ramik & Wight

[57] ABSTRACT

A condensing furnace which includes an outdoor coil of the type having aluminum fins pressed to copper tubes through which a refrigerant is conducted. Heat is generated, preferably from a flame, and the relatively intense temperature (approximately 2200° F.) is de-intensified before reaching the aluminum fins by generally sinusoidal de-intensifier tubes positioned between the flames and the fins of the coil. Since the de-intensifier tubes reduce the temperature of the flue of gases virtually instantly to approximately 50° F., condensation forms not only upon the de-intensifier tubes but also upon the aluminum fins of the coil which prevents acidic deterioration and corrosion thereof, while at the same time maintaining extremely high Btu absorption.

27 Claims, 4 Drawing Sheets

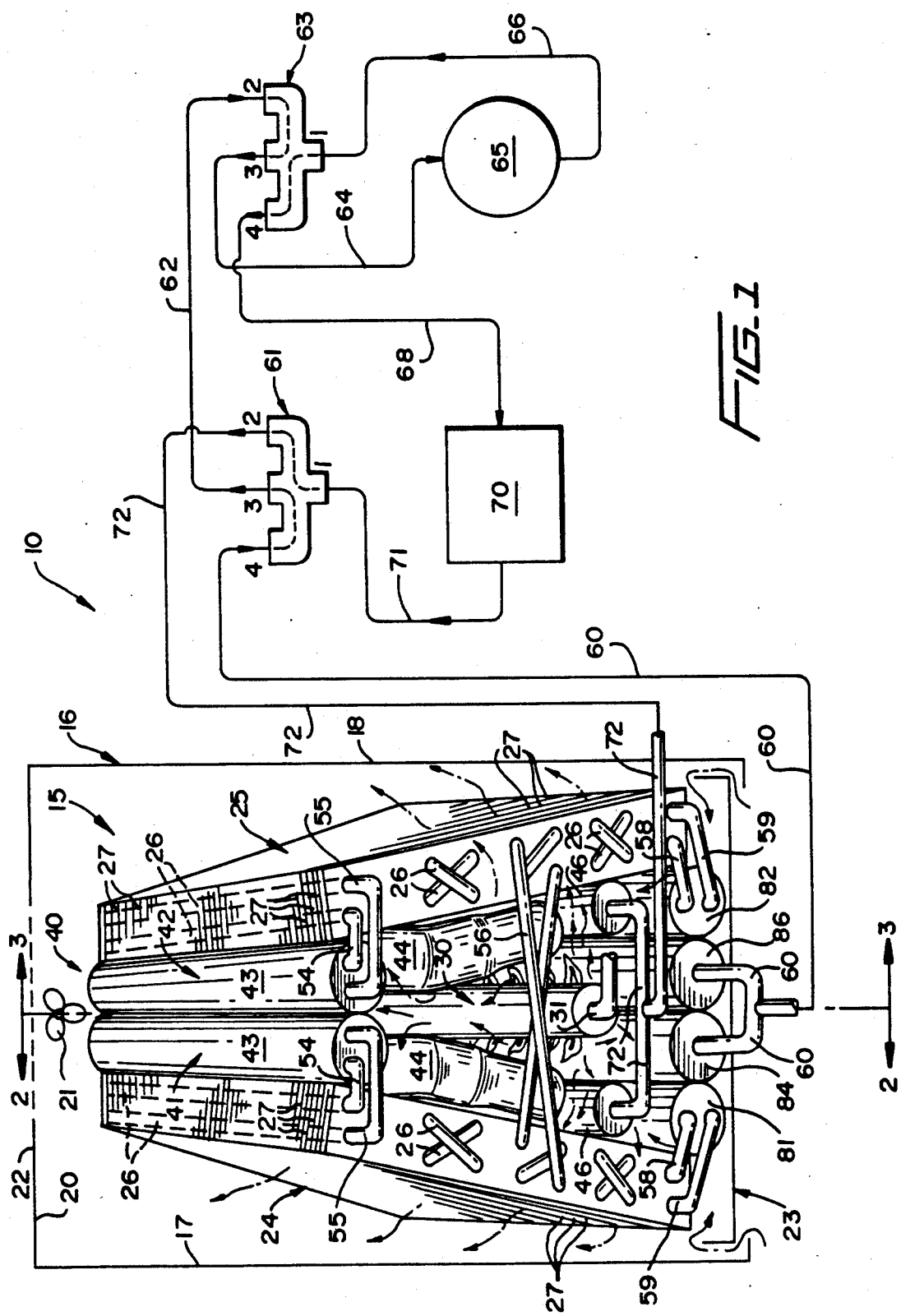

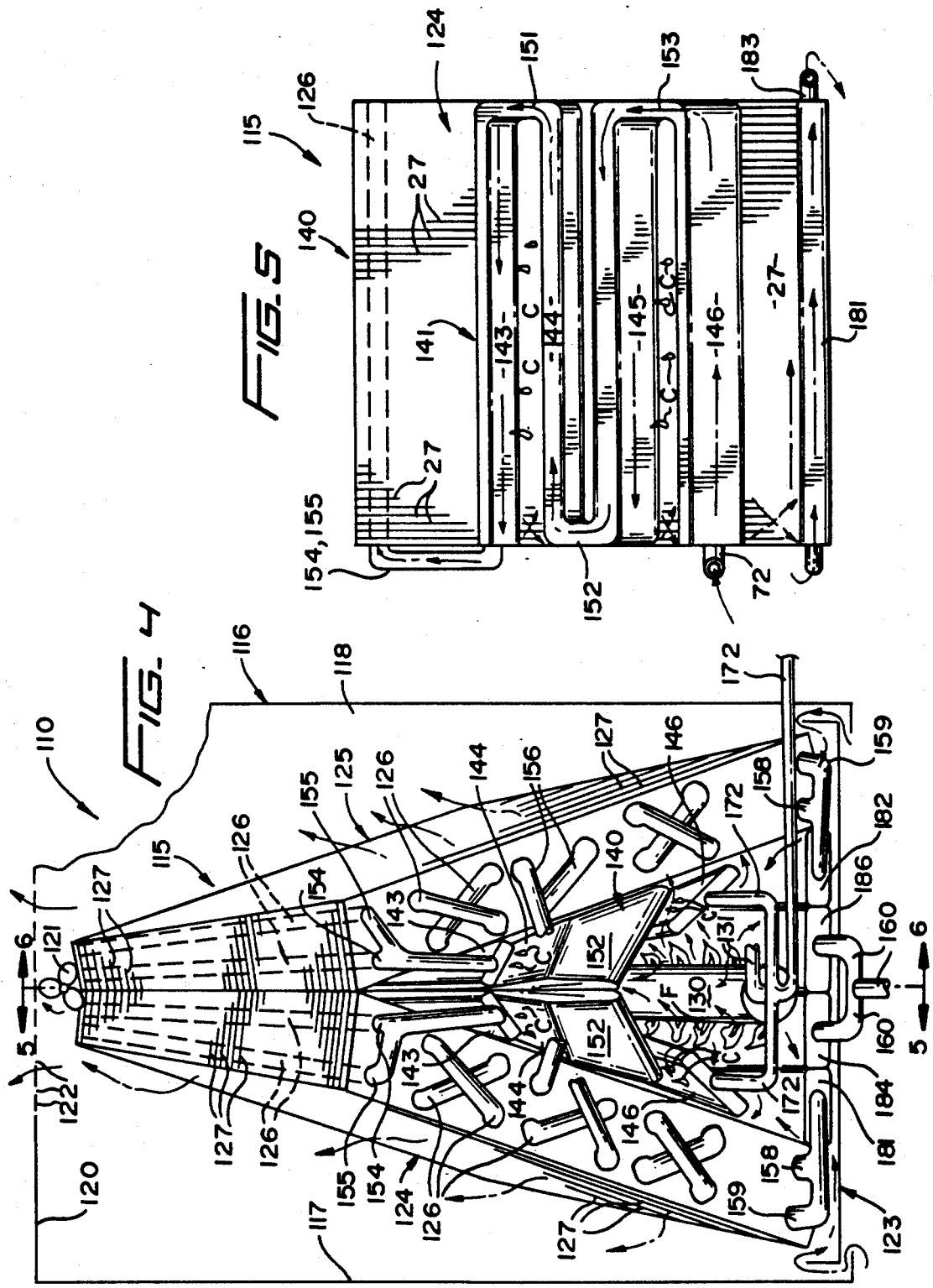

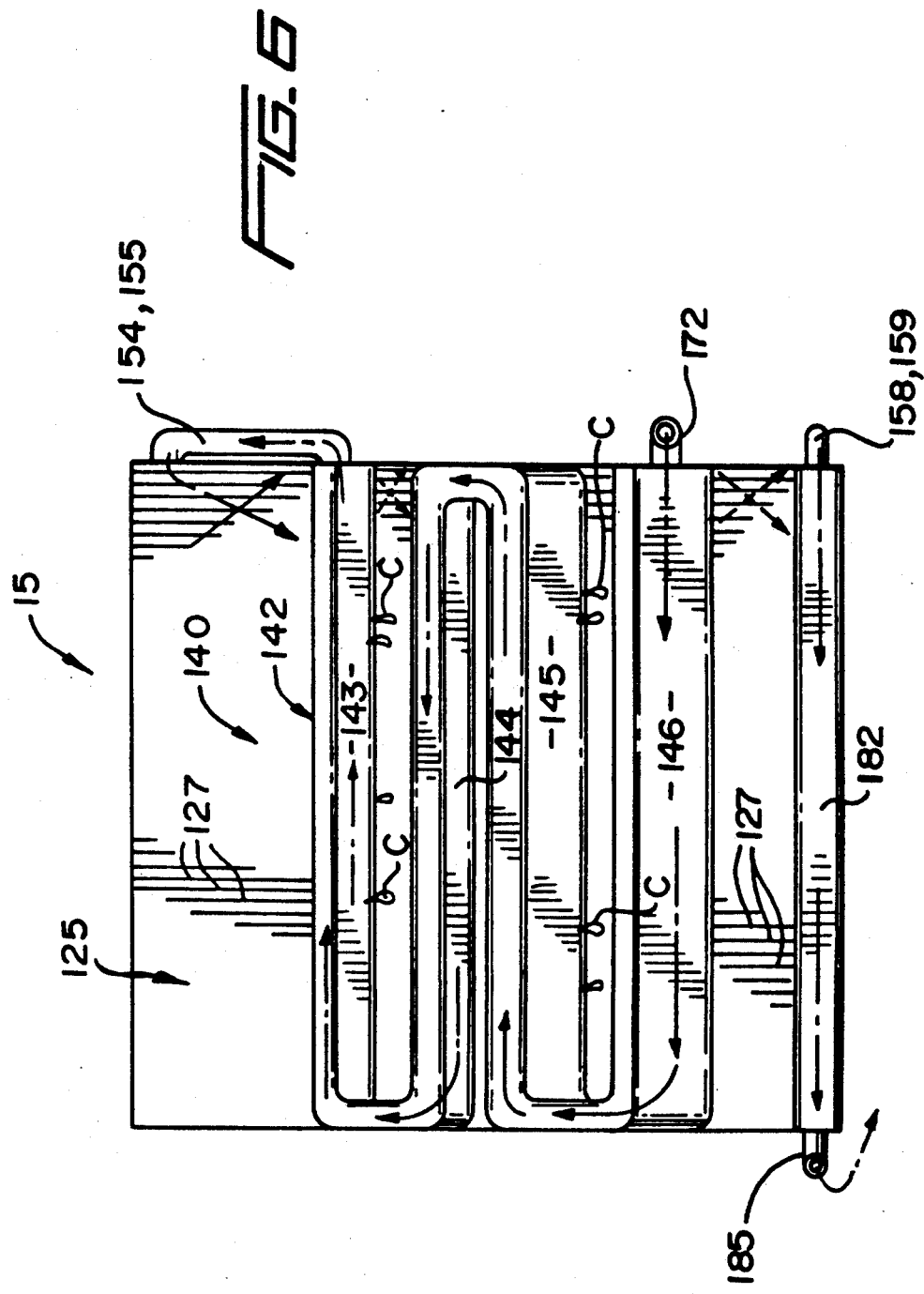

HEAT CONDENSING FURNACE WITH DE-INTENSIFIER TUBES

This application is a continuation of application Ser. No. 07/459,227, filed Dec. 29, 1989 now abandoned.

BACKGROUND OF THE INVENTION

The present invention is related to an improved high efficiency heat condensing furnace or heat exchanger of the type disclosed in U.S. Pat. Nos. 4,311,191 and 4,311,192, each issued on Jan. 19, 1982 in the name of Gerry Vandervaart, as well as other improvement patents also issued in the name of Gerry Vandervaart under U.S. Pat. Nos. 4,420,034; 4,429,734; 4,442,890; 4,415,023; 4,441,546; 4,458,665; 4,461,345; and 4,825,664. The contents of these patents, particularly the first two and the last, are incorporated herein by reference particularly with respect to presently conventional structural and functional characteristics of such prior art heat exchangers or condensing furnaces which are, obviously, compatible with the condensing furnace of the present invention. U.S. Pat. Nos. 4,311,191 and 4,311,192 each disclose a heat exchanger which includes conventional components such as a compressor, indoor and outdoor coils, blowers associated with the coils, one or more reversing/expansion valves and appropriate tubing or conduits such that the heat-exchange medium/refrigerant (Freon) can flow in opposite directions through associated conduits during the air conditioning/cooling mode of operation on the one hand and the heating or heat augmenting modes of operation on the other.

These conventional heat exchangers operate in the heat-augmenting mode through the ignition of a gas burner which provides a very intense flame in a combustion chamber within an outdoor A-coil. Such conventional heat exchangers are extremely efficient up to approximately five (5) tons, and this efficiency is attributed primarily to the fact that the outdoor A-coil is relatively short in height (20 inches high), and the relatively intense heat of the flame is "trapped" within the confines of the A-coil. Though the efficiency is extremely high, the A-coil can become damaged because of the intense heat of the flame primarily because the aluminum fins of the A-coil cannot conduct heat to the copper tubes passing therethrough (conducting the refrigerant) as fast as the aluminum fins absorb the heat from the flame. At the moment of combustion, the flame generated by the burner within the combustion chamber of the A-coil reaches a temperature of approximately 2200° F. If complete combustion and absorption is not achieved, the efficiency drops and unburned gas will escape into the atmosphere. However, if the heat/Btu's are absorbed by the aluminum fins faster than the fins can conduct the heat therethrough and to the copper tubing, the coils will dry out creating an acidic condition which deteriorates the aluminum fins reducing the efficiency and life thereof. Under optimum conditions, the A-coil should absorb all of the heat from the flame as immediately as possible causing the flue gases to cool and condense so that the condensation on the aluminum fins of the A-coil prevents deterioration thereof. Under this optimum condition, the flame is absorbed through the condensation which keeps the exterior of the aluminum fins "wet", prevents drying and acidic deterioration, and assures high efficiency because of maximum Btu absorption and A-coil life.

Obviously, one way to achieve absorption in the absence of drying out of the coil and preventing damage to the aluminum fins thereof would be to minimize the heat of the flame. However, if the heat of the flame were reduced, the output of the overall condensing furnace would be reduced. Accordingly, desirably an optimum condition is that of maintaining the flame at maximum intensity in conjunction with a relatively small A-coil which can absorb the heat from the flame and transfer the heat as fast as it is absorbed to achieve efficiency, yet do so without drying the aluminum fins of the coil. In other words, the intense heat of the flame must be absorbed and cooled such that the flue gases are cold enough to allow condensation to form on and wet the coil and prevent deterioration thereof.

SUMMARY OF THE INVENTION

In keeping with the foregoing, the present invention solves the problem of maintaining high efficiency through maximum heat absorption in the absence of fin/coil deterioration by providing a heat de-intensifier mechanism in the combustion chamber which reduces the temperature of the flue gases created by the burner flame and permits condensation to be formed upon the aluminum fins of the coil to prevent acidic deterioration thereof, while at the same time maintaining extremely high Btu absorption. Preferably the de-intensifier mechanism is one or more de intensifier tubes which are located between the gas burner and the A-coil such that the extremely intense heat of the flame/flue gases are absorbed by the de-intensifier tubes, thereby reducing the temperature of the flue gases reaching the A-coil. The de-intensifier tubes are part of the refrigerant system and the liquid refrigerant is transformed into its vapor state by the intense heat of the flames when absorbed through the de-intensifier tubes. The absorption of the flue gases by the de-intensifier tubes occurs so instantaneously by the refrigerant during the flow thereof through the de-intensifier tubes that the de-intensifier tubes are maintained at a constant temperature of approximately 50° F. and are, therefore, bathed in moisture/condensation and cannot, therefore, corrode because heat absorption takes place through this moisture. The same approximate 50° F. flue gases also partially escape outwardly beyond the de-intensifier tubes through the sides of the A-coil, and again because of the relatively cool temperature (50° F.), the aluminum fins of the A-coil sides are kept moist and the acidic corrosion thereof cannot occur through the condensation/moisture. Thus, the de-intensifier tubes, which are preferably constructed from copper, absorb the intense heat of the flame/flue gases, prevent the same from drying out the de intensifier tubes and/or the aluminum fins of the A-coil sides, and thereby maintains aluminum fin integrity and high heat absorption efficiency.

BRIEF DESCRIPTION OF THE DRAWINGS

FIG. 1 is a schematic view of an overall heat condensing furnace or heat exchanger of this invention, and illustrates an indoor coil, a compressor, a pair of reversing valves, and an outdoor A-coil defined by opposite sides and a pair of de-intensifier tubes between which is located a tube burner and below which are a plurality of drain tubes.

FIG. 4 is a schematic view of an overall condensing furnace/heat exchanger of the present invention, and illustrates another outdoor A-coil which includes a de-intensifier mechanism formed by de-intensifier tubes of a generally flattened configuration.

FIG. 5 is a cross-sectional view taken generally along line 5—5 of FIG. 4, and illustrates the sinusoidal configuration of one of the de-intensifer tubes and an underlying drain tube.

FIG. 6 is a cross-sectional view taken generally along line 6—6 of FIG. 4, and illustrates another of the de-intensifier tubes, the sinusoidal configuration there, and an underlying drain tube.

DESCRIPTION OF THE PREFERRED EMBODIMENT

Figure 3:
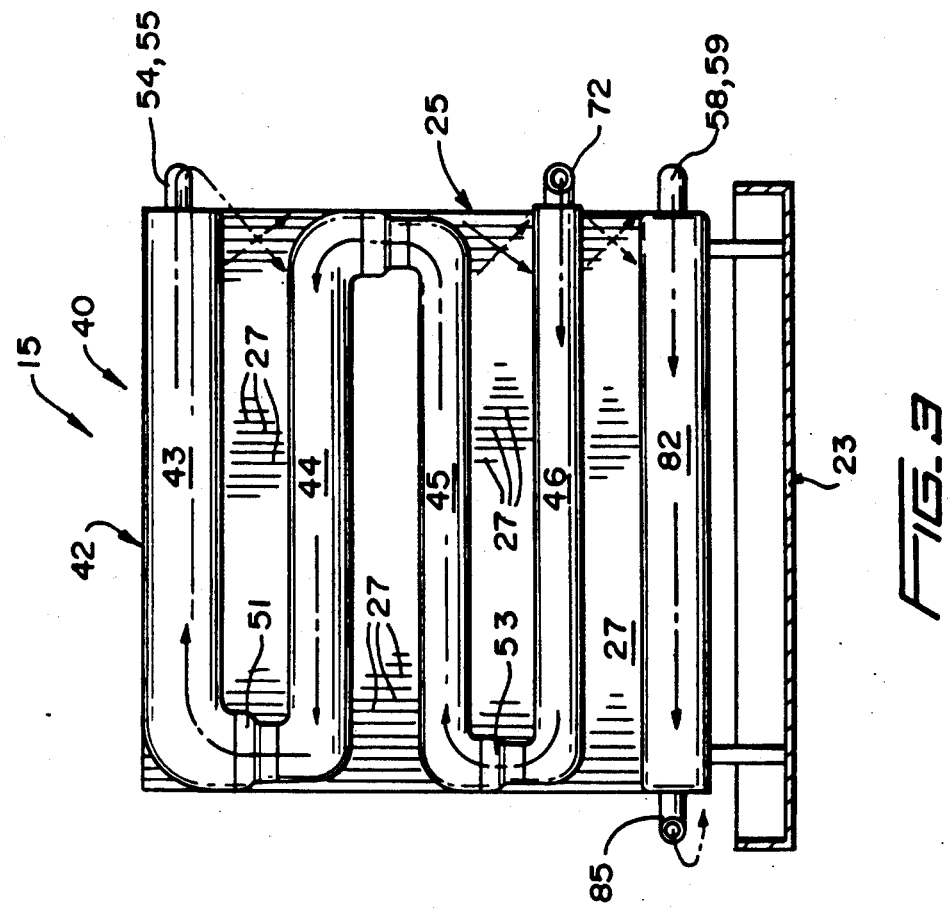
FIG. 3 is a cross-sectional view taken generally along line 3—3 FIG. 1, and illustrates another of the de-intensifier tubes, the generally sinusoidal configuration thereof, the reduction in diameter of portions of the de-intensifier tube from top to bottom, and a drain tube underlying the same.

A novel condensing furnace, heat exchanger or heat-exchange system constructed in accordance with this invention is illustrated in FIG. 1 of the drawings, and is generally designated by the reference numeral 10.

The condensing furnace 10 includes an outdoor coil 15 which is an A-coil which is housed in a housing 16 having generally parallel side walls 17, 18, a top wall 20, opposite end walls (not shown), and an interior draft fan 21 which when energized creates an upwardly directed draft, as indicated by the upper unnumbered headed arrows, which draw exhaust and combustion gases upwardly through the housing 16 and outwardly thereof through apertures 2 of the top wall 20. The A-coil 15 is supported in a condensation pan 23 of a conventional construction. The condensation pan 23 is spaced from the housing 16 to permit combustion air to be introduced into the bottom of the housing 16 in the manner indicated by the unnumbered headed arrows associated therewith.

The A-coil 15 includes generally identical rectangular coils 24, 25 each formed by copper tubing generally designated by the reference numeral 26 and aluminum fins 27 conventionally secured to the exterior of the tubes 20 along the length thereof from front-to-back in a conventional manner. As is more fully described in the latter-identified patents, the refrigerant passing through the copper tubes 26 absorbs the heat/Btu's from the flames/flue gases F emanating from a gas tube burner 30 having two rows of orifices (not shown) along the bottom thereof. The flames F are directed by the orifices generally in opposite directions away from each other and toward the respective coils 24, 25, as is readily apparent in FIG. 1 Gas is introduced into the tube burner 30 through a conduit 31 in a conventional manner and is ignited by an electronic igniter (not shown), as is also conventional. As the refrigerant (Freon) circulates through the copper tubes or tubing 26 of the coils 24, 25, the heat/Btu's of the flames/flue gases F are absorbed and eventually the liquid Freon is transformed into a liquid vapor and subsequently a gas which is discharged over a line 60 to an inlet port "4" of an auxiliary reversing valve 61. The refrigerant gas exits the "3" port of the auxiliary reversing valve 61 and flows through a line 62 to a port "2" of a main reversing valve 63 exiting a port "3" thereof through a line 64 to a compressor 65. Vapor exits the compressor 65 over a line 66, enters a port "1" of the main reversing valve 63, exits a port "4" of the main reversing valve 63 and enters an indoor coil 70 through a line 68. The indoor coil 70 is associated with a blower (not shown) which absorbs the heat from the refrigerant passing through the coil 70 to heat whatever interior, such as a house, is associated with the indoor coil 70. The refrigerant exits the indoor coil 70 over a line 1, enters a port "1" of the auxiliary reversing valve 61, exits a port "2" of the auxiliary reversing valve 61, and the refrigerant, now in its liquid phase, returns to the A-coil 15 via a line 2. The operation just described is more specifically set forth in the first two and last listed patents herein, as well as in patent application Ser. No. 07/406,409 filed Sep. 13, 1989 entitled High Efficiency Heat Exchanger in the name of Gerry Vandervaart.

Since the temperature of the flame/flue gases F is in the vicinity of 2200° F. this high intensity heat is preferably dissipated or de-intensified before reaching the coils 24, 25 and particularly the aluminum fins 27 thereof. It has been found that the aluminum fins 27 which are pressed on the copper tubing do not transfer the heat/Btu's absorbed from the flue gases F to the copper tubing 26 and the Freon/refrigerant circulating therein as fast as the heat is absorbed from the flames F. Because of the latter, condensation cannot form on the exterior of the aluminum fins and the aluminum fins 27 dry out creating an acidic condition which deteriorates the aluminum fins 27 shortening the life thereof and, obviously, reducing the overall efficiency of the condensing furnace 10.

Figure 2:
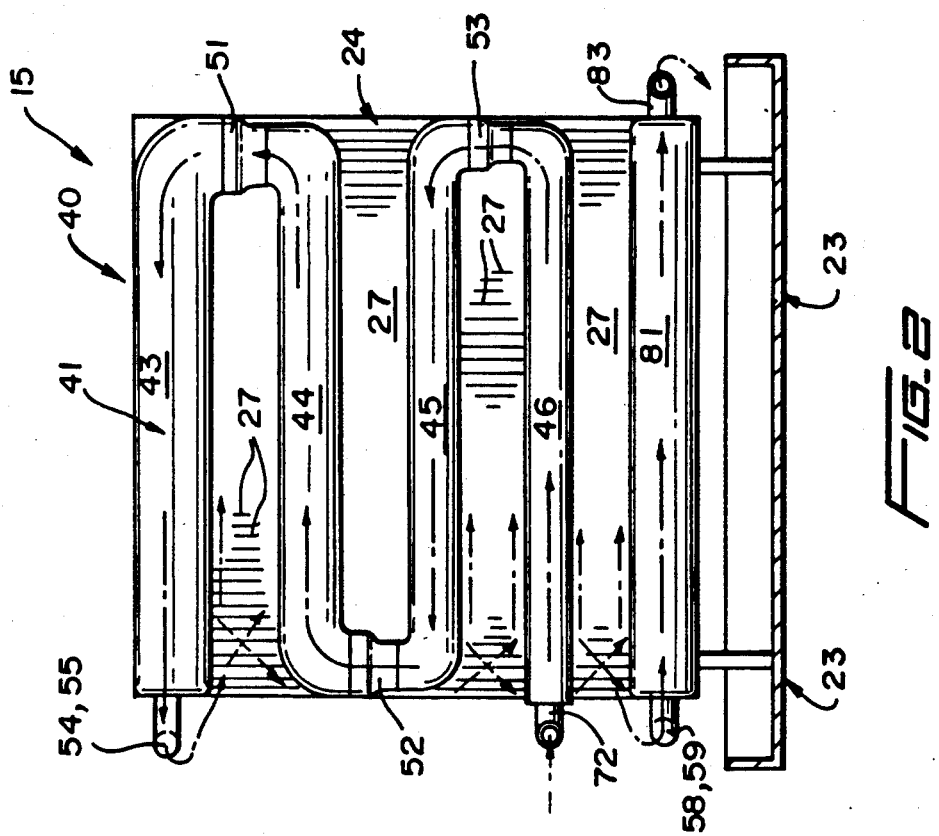
FIG. 2 is a cross sectional view taken generally along line 2—2 of FIG. 1, and illustrates the generally sinusoidal configuration of one of the de-intensifier tubes, the reduction in diameter thereof from top to-bottom, and a lower drain tube.

In accordance with the present invention, means, generally designated by the reference numeral 40, are disposed at a position adjacent the flames F issuing from the tubular burner 30 to de-intensify the relative intense heat of the flame F whereby less intense heat is absorbed by the coils 24, 25 and specifically through the aluminum fins 27 and the copper tubing 26 thereof by the refrigerant flowing through the latter. The means 40 is effectively a heat exchanger in the form of a pair of copper de-intensifier tubes 41, 42 (FIGS. 2 and 3, respectively), each of which is of a generally sinusoidal configuration, as viewed in side elevation (FIGS. 2 and 3).

The sinusoidal de-intensifier tubes 41 and 42 each include an upper cylindrical tube portion 43, a next adjacent cylindrical tube portion 44, a subsequent cylindrical tube portion 45, and a lowermost tube portion 46. The tube portions 43 through 46 are generally in parallel relationship to each other and the transverse cross-sectional size thereof decreases from top to bottom, as is evident in FIGS. 2 and 3. This reduction in diameter of the tube portions 43 through 46 is effected by reducing tubes 51 through 53. The purpose of the reduction in diameter of the tube portions 43 through 46 from top to bottom is to permit condensation which forms upon the exterior surfaces of these tube portions to drop downwardly upon the next lowermost tube portions(s) to assure that all of the tube portions will be kept wet. For example, condensation which forms upon the tube portions 43 of the sinusoidal deintensifier tubes 41, 42 will drip downwardly upon the underlying tube portions 44, etc.

The liquid refrigerant in the line 72 enters both sinusoidal de-intensifier tubes 41, 42 through the front end, as viewed in FIG. 1, of the lowest tube portion 46, travels upwardly through the successive tube portions 45, 44 and 43, as indicated by the unnumbered headed arrows associated therewith, and exits the uppermost tube portions 43 of both sinusoidal de-intensifier tubes 41, 42 through tubes 54, 55 which are connected to the associated copper tubes 26 of the respective coils or side coils 24, 25. The refrigerant flows through the copper tubes 26 in a downward direction, as is indicated by the crossed unnumbered headed arrows associated therewith in FIGS. 2 and with crossover occurring by crossover tubes 56 until eventually the refrigerant exits the tubing 26 at the bottom of the side coils 24, 25 through tubes 58, 59. The refrigerant exiting the tubes 58, 59 enters larger cylindrical drain tubes 81, 82 (FIG. 2). The drain tube 81 is connected at the end opposite the tubes 58, 59 by a tube 83 (FIG. 2) to an enlarged cylindrical drain tube 84 which is in turn connected to the conduit 60. The cylindrical drain tube 82 is likewise connected by a tube 85 (FIG. 3) to a drain tube 86 which is connected at its forward end to the conduit 60. Thus, the refrigerant which enters the drain tube 81 flows from front-to-rear, as viewed in FIG. 1, enters the conduit 83, and returns from rear to front through the drain tube 84 exiting the latter into the conduit 60. Similarly, the refrigerant entering the drain tube 82 flows from front-to-rear (FIG. 1), enters the tube 85 (FIG. 3), and returns from rear-to-front through the drain tube 86 entering the conduit 60.

When the condensing furnace 10 is in its heat augmenting mode, the reversing valves 61, 63 are positioned to effect refrigerant flow in the manner heretofore described relative to FIG. 1. The igniter (not shown) ignites the gas which in turn generates the flames F having a relatively intense temperature of approximate 2200° F. However, the heat/flue gases F radiating from the burner 30 are absorbed virtually instantaneously by the copper de intensifier tubes 41, 42 and the refrigerant flowing therethrough under the influence of the compressor 65. The refrigerant initially entering the lowermost tubular portions 46 of the de-intensifier tubes 41, 42 is in its liquid state but eventually is transformed into its vapor state as it travels upwardly through the various tube portions and exits the uppermost tube portions 43 through the tubes 54, 55. Since the de-intensifier tubes 41, 42 are placed directly in the path of the flames F and the natural tendency thereof to go in the direction proportionate to its intensity, the flames F and specifically the Btu's thereof are absorbed virtually instantaneously by the refrigerant flowing through the de-intensifier tubes 41, 42 reducing the temperature of the flue gases virtually instantaneously to 50° F. which is cold enough to allow condensation to form not only on the de intensification tubes 41, 42 but also upon the coils 24, 25 and specifically the aluminum fins 27 thereof. Thus, the exterior surfaces of the sinusoidal de-intensifier tubes 41, 42 are kept "wet" with condensation, as are the fins 27, and the latter will not dry out, thus avoiding the heretofore mentioned undesired acidic condition which would deteriorate the aluminum fins 27. Thus, though flue gases F will, obviously, also pass through the de intensifier tubes 41, 42 and the Btu's will be absorbed by the refrigerant flowing through the tubes 26 of the coils 24, 25, the condensation on the fins 27 of the latter assures that heat absorption takes place through such moisture/condensation and corrosion of the fins 27 will not occur. Hence, in the heat augmented mode of operation of the condensing furnace 10, the relatively small coil 15 (8" high, 20" long and 1½" per side) is extremely efficient and when operating as aforesaid, the interior of the housing 10 exteriorily of the A-coil 15 has no trace of heat and an ambient of 50° F.

The bottom edge (unnumbered) of the side coils or coils 24, 25 are also slightly (¼") above the drain tubes 81, 84, 82 and 86 and the side coils 24, 25 are also spaced approximately ½" away from side walls or panels 17, 18 and the periphery and bottom (unnumbered) of the condensation pan 23. The latter is provided so that when combustion takes place to create the flame/flue gases F, air is drawn up evenly along both sides of the coils 24, 25 interiorly thereof into the area of the tube burner 30 and is forced upwardly without losing any heat/Btu's to the ambient. The latter can be augmented by energizing the draft fan 21, although this is not necessary at temperatures of 40° F. and lower. However, because of the extremely low flue gas temperature discharge (approximately 50° F.), the draft fan 21 should be energized above 40° F. Also, the crossover or crossover tubing 56 is preferred because the burner 30 will not generate an even flame F at opposite sides thereof and, therefore, even a slight coil pressure drop can cause heat to be drawn up faster on one side than the other. Thus, the crossover 50 assures equal updraft of the flue gases F and more efficient absorption of the heat/Btu's thereof by the refrigerant flowing through the de intensifier mechanism 40 and the coils 24, 25.

It should also be appreciated that the flames F do not simply come directly laterally outwardly of both sides of the burner 30, but radiant heat is also reflected downwardly which under normal circumstances could create heat loss. However, the refrigerant exiting the tubes 58, 59 flows into the drain tube 81, 84, 86 and 82 which are located directly beneath the reflected heat, absorbing the same, and transferring the absorbed reflected heat back to the compressor 65. Thus, virtually all of the heat generated by the burner 30 is totally absorbed rendering the overall condensing furnace 10 extremely efficient.

The condensing furnace 10 is, of course, operative in the absence of the generation of the flame F in the strict heat pump mode of operation thereof, and the reversing valve 61, 63 can be appropriately manipulated for cooling/air conditioning operations, in the manner fully described in Ser. No. 406,409 which is incorporated hereat by reference.

Reference is now made to FIGS. 4 through 6 of the drawings which illustrates another gas condensing furnace of the present invention which is generally designated by the reference numeral The condensing furnace 110 includes an outdoor coil 115 which is an A-coil which is housed in a housing 116 having generally parallel side walls 117, 118, a top wall 120, opposite end walls (not shown) and an interior draft fan 121 which when energized creates an upwardly directed draft, as indicated by the upper unnumbered headed arrows, which draw exhaust and combustion gases upwardly through the housing 116 and outwardly thereof through apertures 122 of the top wall 120. The A-coil 115 is supported in a condensation pan 123 of a conventional construction. The condensation pan 123 is spaced from the housing 116 to permit combustion air to be introduced into the bottom of the housing 116 in the manner indicated by the unnumbered headed arrows associated therewith.

The A-coil 115 includes generally identical rectangular coils 124, 125 each formed by copper tubing generally designated by the reference numeral 120 and aluminum fins 127 pressed onto the exterior of the tubes 126 along the length thereof from front-to-back, as viewed in FIG. 4, in a conventional manner. The refrigerant passing through the copper tubes 120 absorbs the heat/Btu's from the flames/flue gases F' emanating from a gas tube burner 130 having two rows of orifices (not shown) along the bottom thereof. The flames F' are directed by the orifices generally in opposite directions away from each other and toward the respective coils 124, 125, as is readily apparent in FIG. 4. Gas is introduced into the tube burner 130 through a conduit 131 in a conventional manner and is ignited by an electronic igniter (not shown), as is also conventional. As the refrigerant (Freon) circulates through the copper tubes or tubing 120 of the coils 124, 125, the heat/Btu's of the flames/flue gases F' are absorbed and eventually the liquid refrigerant is transformed into a liquid vapor and subsequently a gas which is discharged over a line 160 which circulates in the same manner as that heretofore described relative to FIG. 1.

Since the temperature of the flame/flue gases F' is in the vicinity of 2200° F., this high intensity heat is preferably dissipated or de-intensified before reaching the coils 124,125 and particularly the aluminum fins 127 thereof. In accordance with the invention of FIGS. 4 through 6, means 140 are disposed at a position adjacent the flames F' issuing from the tubular burner 130 to de-intensify the relative intense heat of the flame F' whereby less intense heat is absorbed by the coils 124, 125 and specifically by the aluminum fins 127 and the copper tubing 126 thereof. The means 140 is effectively a heat exchanger in the form of a pair of copper de-intensifier tubes 141, 142 (FIGS. 5 and 6, respectively), each of which is of a generally sinusoidal configuration, as viewed in side elevation (FIGS. 5 and 6).

The sinusoidal de-intensifier tubes 141 through 142 each include an upper, shallow, flat, rectangular tube portion 143; a next adjacent shallow, flat, rectangular tube portion 144; a subsequent shallow, flat, rectangular tube portion 145; and a lowermost, shallow, flat, rectangular tube portion 146. The tube portions 143 through 146 are generally in parallel relationship to each other lengthwise from front-to-back, as is most readily evident in FIGS. 5 and 6 of the drawings. The tube portions 143 through 146 are also angularly tilted relative to each other, as viewed from either the front or the back, as is most apparent from FIG. 4. Furthermore, selected ones of the tube portions 143 through 146 can differ in transverse cross-section or size relative to each other to permit condensation on an uppermost tubular portion to drip downwardly and fall upon a lowermost tube portion, as was described more fully heretofore relative to the primary differences between the de-intensifier mechanisms 40 and 140 are threefold: (1) the relatively shallow, flat, rectangular configuration of the tube portions 143 through 146 present a relatively large, flat cross-sectional area to the radiating flames, flue gasses F' which increases the absorption efficiency., (2) the angular tilting of the tube portions 143 through 146 defines a generally inclined flow path for condensation to flow along the underside (and the upperside) of each tube portion 143 through 146 before dripping downwardly upon the next lowermost tube portion., and (3) both de-intensifier tubes 141, 142 are totally housed within the sides 124, 125 of the A-coil 115 which significantly reduces the exiting of flue gases directly upwardly between the contacting upper ends (unnumbered) of the coils 124, 125 assuring that the flue gases essentially must pass through the coils 124, 125. These three factors further increase the overall efficiency of the condensing furnace 110, as compared to the condensing furnace 10. In addition, the tube portions 141 through 146 are selectively connected together by shallow, flat, rectangular reducing tubes 151 through 155 for the purpose heretofore described. However, in this case the tube portions 143, 143 are of a smaller cross-section than the underlying tube portions 144, 144, whereas the tube portions 145, 145 are of a larger cross-section than the underlying tube portions 146, 146 This is done to more efficiently absorb the Btu's from the flue gases F' while still assuring that the condensation from each uppermost tube portion will drip downwardly upon the underlying next adjacent tube portion because of the inclination or tilting thereof, as is best illustrated in FIG. 4 which illustrates condensation or droplets C dripping in this fashion from the tube portions 143 downwardly upon the tube portions 144 and from the tube portions 145 downwardly upon the tube portions 146. In this fashion all condensation which forms on the exterior surfaces of the tube portions 143 through 146 will drop downwardly upon the next lowermost tube portion to assure that all of the tube portions 143 through 146 will be kept moist with condensation and preclude the undesired acidic/corrosive conditions earlier noted.

The condensing furnace 110 is otherwise operational in the manner heretofore described relative to the condensing furnace 10.

Although a preferred embodiment of the invention has been specifically illustrated and described herein, it is to be understood that minor variations may be made in the apparatus without departing from the spirit and scope of the invention, as defined in the appended claims.

I claim:

1. A gas condensing furnace comprising an outdoor coil burner assembly, said outer coil burner assembly including first and second outdoor heat exchanger means for conducting a refrigerant therethrough; said first outdoor heat exchanger means including a first outdoor coil defining a first refrigerant series flow path having a refrigerant inlet and a refrigerant outlet; said first refrigerant series flow path establishes refrigerant flow in a first general direction, said second outdoor heat exchanger means including a second outdoor coil defining a second refrigerant series flow path having a refrigerant inlet and a refrigerant outlet; said second refrigerant series flow path establishes refrigerant flow in a second general direction generally opposite to said first refrigerant series flow path first general direction, means for generating relatively intense heat relative to ambient temperature which is adapted to be absorbed by said first outdoor coil, said second outdoor coil being positioned generally between said first outdoor coil and said intense heat generating means for de-intensifying the relatively intense heat of the intense heat generating means whereby less intense heat is absorbed by said first outdoor coil and the refrigerant flowing therethrough, said first and second outdoor coils and the refrigerant inlets and outlets thereof being in series communication with each other, a compressor and an indoor coil, refrigerant conduit means for placing an outlet of said compressor in refrigerant communication with an inlet of said indoor coil, and further refrigerant conduit means for placing an outlet of said indoor coil in refrigerant communication with said second outdoor coil inlet and for placing said first outdoor coil outlet in refrigerant communication with an inlet of said compressor.

2. The gas condensing furnace as defined in claim 1 wherein said first and second refrigeration flow directions are respectively generally downwardly and upwardly.

3. The gas condensing furnace as defined in claim 1 wherein said second coil includes generally superimposed coil portions whereby condensate formed thereon will drip from an upper coil portion toward a lower coil portion.

4. The gas condensing furnace as defined in claim 1 wherein said second coil is of a generally sinuous shaped configuration.

5. The gas condensing furnace as defined in claim 1 wherein said second coil includes a generally sinuous shaped coil having generally superimposed coil portions whereby condensate formed thereon will drip from an upper coil portion toward a lower coil portion.

6. The gas condensing furnace as defined in claim 1 wherein said second coil includes a generally sinuous shaped coil having generally superimposed coil portions whereby condensate formed thereon will drip from an upper coil portion toward a lower coil portion, and said upper coil portion is larger in transverse cross-section than said lower coil portion.

7. The gas condensing furnace as defined in claim 1 including third heat exchanger means disposed adjacent said intense heat generating means for additionally de-intensifying the relatively intense heat of the intense heat generating means.

8. The gas condensing furnace as defined in claim 1 including third heat exchanger means disposed adjacent said intense heat generating means for additionally de-intensifying the relatively intense heat of the intense heat generating means, said third heat exchanger means is a third coil having a refrigerant inlet and a refrigerant outlet, and said first coil refrigerant outlet is connected to said third coil refrigerant inlet.

9. The gas condensing furnace as defined in claim 1 including third heat exchanger means disposed adjacent said intense heat generating means for additionally de-intensifying the relatively intense heat of the intense heat generating means, and said third heat exchanger means is located generally below said intense heat generating means.

10. The condensing furnace as defined in claim 1 wherein said intense heat generating means is a burner.

11. The condensing furnace as defined in claim 1 wherein said intense heat generating means is a burner, and said first coil is constructed and arranged to define a combustion chamber within which said burner is located.

12. The condensing furnace as defined in claim 1 wherein said intense heat generating means is a burner, said first coil is of an inverted V-shaped configuration, and said first coil is constructed and arranged to define a combustion chamber within which said burner is located.

13. The condensing furnace as defined in claim 1 wherein said intense heat generating means is a burner, said first coil is of an inverted V-shaped configuration, and said first coil is constructed and arranged to define a combustion chamber within which said second coil and burner are located.

14. The gas condensing furnace as defined in claim 1 including third heat exchanger means disposed adjacent said intense heat generating means for additionally de-intensifying the relatively intense heat of the intense heat generating means, said third heat exchanger means is a third coil having a refrigerant inlet and a refrigerant outlet, said first coil refrigerant outlet is connected to said third coil refrigerant inlet, and said third coil includes a pair of generally side-by-side coil portions.

15. The gas condensing furnace as defined in claim 1 including third heat exchanger means disposed adjacent said intense heat generating means for additionally de-intensifying the relatively intense heat of the intense heat generating means, said third heat exchanger means is a third coil having a refrigerant inlet and a refrigerant outlet, said first coil refrigerant outlet is connected to said third coil refrigerant inlet, and said third coil includes a pair of generally side-by-side parallel coil portions.

16. The gas condensing furnace as defined in claim 2 wherein said second coil includes generally superimposed coil portions whereby condensate formed thereon will drip from an upper coil portion toward a lower coil portion.

17. The gas condensing furnace as defined in claim 2 wherein said second coil includes a generally sinuous shaped coil having generally superimposed coil portions whereby condensate formed thereon will drip from an upper coil portion toward a lower coil portion.

18. The gas condensing furnace as defined in claim 2 including third heat exchanger means disposed adjacent said intense heat generating means for additionally de-intensifying the relatively intense heat of the intense heat generating means, and said third heat exchanger means is located generally below said intense heat generating means.

19. The condensing furnace as defined in claim 2 wherein said intense heat generating means is a burner, said first coil is of an inverted V-shaped configuration, and said first coil is constructed and arranged to define a combustion chamber within which said burner is located.

20. The gas condensing furnace as defined in claim 2 including reversing valve means for effecting reversal of refrigerant flow through said first and second outdoor coils for air conditioning purposes when said intense heat generating means is inoperative, and said reversing valve means being located such that during the operation of said intense heat generating means the refrigerant flows from the first coil outlet successively to said reversing valve means, to said compressor, to said indoor coil and to said second coil inlet.

21. The gas condensing furnace as defined in claim 2 including third heat exchanger means disposed adjacent said intense heat generating means for additionally de-intensifying the relatively intense heat of the intense heat generating means, said third heat exchanger means is a third coil having a refrigerant inlet and a refrigerant outlet, said first coil refrigerant outlet is connected to said third coil refrigerant inlet, and said third coil includes a pair of generally side-by-side parallel coil portions.

22. The gas condensing furnace as defined in claim 7 wherein said first and second refrigerant flow directions are respectively generally downwardly and upwardly.

23. The gas condensing furnace as defined in claim 7 wherein said second coil includes generally superimposed coil portions whereby condensate formed thereon will drip from an upper coil portion toward a lower coil portion.

24. The gas condensing furnace as defined in claim 7 wherein said second coil includes a generally sinuous shaped coil having generally superimposed coil portions whereby condensate formed thereon will drip from an upper coil portion toward a lower coil portion.

25. The gas condensing furnace as defined in claim 7 including third heat exchanger means disposed adjacent said intense heat generating means for additionally de-intensifying the relatively intense heat of the intense heat generating means, and said third heat exchanger means is located generally below said intense heat generating means.

26. The condensing furnace as defined in claim 7 wherein said intense heat generating means is a burner, said first coil is of an inverted V-shaped configuration, and said first coil is constructed and arranged to define a combustion chamber within which said burner is located.

27. A gas condensing furnace comprising an outdoor coil burner assembly, said outer coil burner assembly including first and second outdoor heat exchanger means for conducting a refrigerant therethrough; said first outdoor heat exchanger means including a first outdoor coil defining a first refrigerant series flow path having a refrigerant inlet and a refrigerant outlet; said first refrigerant series flow path establishes refrigerant flow in a first general direction, said second outdoor heat exchanger means including a second outdoor coil defining a second refrigerant series flow path having a refrigerant inlet and a refrigerant outlet; said second refrigerant series flow path establishes refrigerant flow in a second general direction generally opposite to said first refrigerant series flow path first general direction, means for generating relatively intense heat relative to ambient temperature which is adapted to be absorbed by said first outdoor coil, said second outdoor coil being positioned generally between said first outdoor coil and said intense heat generating means for de-intensifying the relatively intense heat of the intense heat generating means whereby less intense heat is absorbed by said first outdoor coil and the refrigerant flowing therethrough, said first and second outdoor coils and the refrigerant inlets and outlets thereof being in series communication with each other, a compressor and an indoor coil, refrigerant conduit means for placing an outlet of said compressor in refrigerant communication with an inlet of said indoor coil, further refrigerant conduit means for placing an outlet of said indoor coil in refrigerant communication with said second outdoor coil inlet and for placing said first outdoor coil outlet in refrigerant communication with an inlet of said compressor, reversing valve means for effecting reversal of refrigerant flow through said first and second outdoor coils for air conditioning purposes when said intense heat generating means is inoperative, and said reversing valve means being located such that during the operation of said intense heat generating means the refrigerant flows from the first outdoor coil outlet successively to said reversing valve means, to said compressor, to said indoor coil and to said second outdoor coil inlet.

* * * * *